(12) United States Patent
Deeba

(10) Patent No.: US 6,568,179 B2
(45) Date of Patent: May 27, 2003

(54) APPARATUS AND METHOD FOR VEHICLE EMISSIONS CONTROL

(75) Inventor: Michel Deeba, East Brunswick, NJ (US)

(73) Assignee: Engelhard Corporation, Iselin, NJ (US)

( * ) Notice: Subject to any disclaimer, the term of this patent is extended or adjusted under 35 U.S.C. 154(b) by 18 days.

(21) Appl. No.: 09/797,236

(22) Filed: Mar. 1, 2001

(65) Prior Publication Data

US 2002/0121084 A1 Sep. 5, 2002

(51) Int. Cl.$^7$ ................................................ F01N 3/00
(52) U.S. Cl. ............................ 60/298; 60/274; 60/276; 60/288; 60/320
(58) Field of Search .................... 60/274, 276, 285, 60/287, 288, 298, 300, 320

(56) References Cited

U.S. PATENT DOCUMENTS

| | | | |
|---|---|---|---|
| 4,358,927 A | | 11/1982 | Day et al. |
| 4,817,385 A | | 4/1989 | Kumagai |
| 5,184,462 A | * | 2/1993 | Schatz ........................ 60/298 |
| 5,201,802 A | * | 4/1993 | Hirota et al. ................ 60/300 |
| 5,250,268 A | * | 10/1993 | Geiger ........................ 60/298 |
| 5,722,236 A | | 3/1998 | Cullen et al. ................ 60/274 |
| 5,832,721 A | * | 11/1998 | Cullen .......................... 60/274 |
| 5,855,113 A | * | 1/1999 | Cullen et al. ................ 60/274 |
| 5,983,628 A | | 11/1999 | Borroni-Bird et al. |
| 5,987,885 A | | 11/1999 | Kizer et al. |
| 6,009,703 A | * | 1/2000 | Bouchez et al. ............. 60/298 |
| 6,009,742 A | * | 1/2000 | Balko .......................... 60/276 |
| 6,018,943 A | * | 2/2000 | Martin et al. ................ 60/287 |
| 6,041,592 A | * | 3/2000 | Huynh et al. ................ 60/285 |
| 6,105,365 A | | 8/2000 | Deeba et al. |
| 6,155,042 A | | 12/2000 | Perset et al. |
| 6,185,935 B1 | * | 2/2001 | Dickers et al. .............. 60/288 |

FOREIGN PATENT DOCUMENTS

| | | | | |
|---|---|---|---|---|
| EP | 1 134 367 A2 | | 9/2001 | ............. F01N/3/04 |
| GB | 2 273 174 A | | 6/1994 | ............. F01N/9/00 |
| JP | 62-99611 | * | 5/1987 | |
| JP | 08109822 | | 4/1996 | ............. F01N/3/24 |
| JP | 2001055918 | | 2/2001 | ............. F01N/3/24 |
| WO | WO 97/43031 | | 11/1997 | ........... B01D/53/56 |

* cited by examiner

Primary Examiner—Thomas Denion
Assistant Examiner—Tu M. Nguyen
(74) Attorney, Agent, or Firm—Richard A. Negin

(57) ABSTRACT

An apparatus and method for vehicle emissions control are disclosed. More particularly, an apparatus and method for insuring that the temperature of a vehicle's exhaust gas stream entering the underfloor catalytic converter during engine operation does not exceed the temperature at which the capability of the multi-functional catalyst in the converter to absorb $NO_x$ starts to fall off. A first temperature sensor is provided in the exhaust outlet leading from the exhaust manifold of the engine and a second temperature sensor is provided in the catalytic converter. The catalytic converter contains a multi-functional catalyst such as a three-way conversion catalyst and a $NO_x$ trap as well as a $NO_x$ sensor at its outlet for sensing when $NO_x$ breakthrough is occurring. The sensors transmit their readings to a controller which transmits signal to a proportional valve located in the exhaust outlet downstream of the first temperature sensor. In response to the signals received from the controller, the proportional valve divides the exhaust gas stream received from the engine exhaust manifold into a first stream in communication with the catalytic converter and a second stream in communication with a heat exchanger. Any stream exiting the heat exchanger is then blended with the non-heat exchanged stream and the blended stream is passed into the catalytic converter. The amount of the exhaust gas stream in the first conduit will vary from that in the second conduit such that the temperature entering the catalytic converter is maintained in the range of about 300 to about 600° C. during the lean mode operation of the engine and further such that the multi-functional catalyst is periodically purged of $NO_x$ and/or $SO_x$.

25 Claims, 1 Drawing Sheet

APPARATUS AND METHOD FOR VEHICLE EMISSIONS CONTROL

FIELD OF THE INVENTION

This invention relates to an apparatus and method for vehicle emissions control and more particularly, to an apparatus and method for controlling the temperature of the exhaust gas stream exiting the exhaust manifold and entering an underfloor catalytic converter containing a multi-functional catalyst, e.g., a three-way conversion catalyst and a nitrogen oxides ("$NO_x$") trap.

BACKGROUND OF THE INVENTION

Conventional lean-burn engine control systems include an air/fuel controller that delivers fuel to the engine intake manifold proportional to measured air mass to maintain a desire air/fuel ratio, lean of stoichiometric. Emissions of nitrogen oxides ("$NO_x$") from lean-burn engines (described below) must be reduced in order to meet emission regulation standards. Conventional three-way conversion ("TWC") automotive catalysts are suitable for abating $NO_x$ carbon monoxide ("CO") and hydrocarbon ("HC") pollutants in the exhaust of engines operated at or near stoichiometric air/fuel conditions. The precise proportion of air to fuel that results in stoichiometric conditions varies with the relative proportions of carbon and hydrogen in the fuel. An air-to-fuel ("A/F") ratio of 14.65:1 (weight of air to weight of fuel) is the stoichiometric ratio corresponding to the combustion of a hydrocarbon fuel, such as gasoline, with an average formula $CH_{1.88}$. The symbol $\lambda$ is thus used to represent the result of dividing a particular A/F ratio by the stoichiometric A/F ratio for a given fuel, so that $\lambda=1$ is a stoichiometric mixture, $\lambda>1$ is a fuel-lean mixture and $\lambda<1$ is a fuel-rich mixture.

Engines, especially gasoline-fueled engines to be used for passenger automobiles and the like, are now designed to operate under lean conditions as a fuel economy measure. Such engines are referred to as "lean-burn engines". That is, the ratio of air to fuel in the combustion mixtures supplied to such engines is maintained considerably above the stoichiometric ratio (e.g., at an air-to-fuel weight ratio of 18:1) so that the resulting exhaust gases are "lean", i.e., the exhaust gases are relatively high in oxygen content.

Although lean-burn engines provide enhanced fuel economy, they have the disadvantage that conventional TWC catalysts are not effective for reducing $NO_x$ emissions from such engines because of excessive oxygen in the exhaust. The prior art discloses attempts to overcome this problem by operating lean-burn engines with brief periods of fuel-rich operation. (Engines which operate in this fashion are sometimes referred to as "partial lean-burn engines".)

The typical TWC catalyst provided in the exhaust passage as a "close-coupled" catalytic converter does not convert the $NO_x$ produced when the engine is running lean, i.e., when $\lambda>1$. In order to reduce the $NO_x$ emission to the atmosphere, it is known to use an underfloor catalytic converter located downstream of the medium-coupled or close-coupled catalytic converter. "Close-coupled" catalytic converters are known in the prior art and are generally defined as located in or near the engine compartment, typically less than one foot, more typically less than six inches from, and preferably immediately adjacent to, i.e., attached directly to, the outlet of the exhaust manifold. "Underfloor" catalytic converters are also known in the prior art and are located (downstream of any close-coupled catalysts)under the floor of the vehicle adjacent to or in combination with the vehicle's muffler.

It is known to treat the exhaust of such engines with an underfloor catalytic converter containing a multi-functional catalyst, e.g., a TWC catalyst/$NO_x$ trap which stores $NO_x$ during periods of lean (oxygen-rich) operation, and releases the stored $NO_x$ during the rich (fuel-rich) periods of operation. A typical $NO_x$ trap utilizes alkali metal or alkaline earth metal oxides in combination with the precious metal catalyst component in order to store or occlude $NO_x$ under lean operating conditions. The mechanism for $NO_x$ storage is believed to involve the oxidation of NO to $NO_2$ over the precious metal component of the TWC catalyst followed by the subsequent formation of a nitrate complex with the alkali metal or alkaline earth metal oxide. Under engine operation rich of stoichiometric ($\lambda<1$), the nitrate complexes are thermodynamically unstable, and the stored $NO_x$ is released and catalytically reduced by the excess of CO, HCs and $H_2$ in the exhaust. Periodically, the lean-burn engine is switched to a relatively rich air/fuel ratio to purge the $NO_x$ trap.

It is also known that exposure of the $NO_x$ trap to excessive temperatures, e.g. 750° C. and higher, during the operation of the engine will result in a significant diminution of the capability of the $NO_x$ trap to absorb the $NO_x$ in the exhaust gas stream Therefore, it would be desirable to provide some means of insuring that the temperature of the exhaust gas stream entering the underfloor catalytic converter containing the $NO_x$ trap during the operation of the engine does not exceed the temperature at which the capability of the trap to absorb the $NO_x$ in the exhaust gas stream starts to fall off.

Lean-burn engines are designed for fuel economy. In such engines, operations alternate depending on speed and load. At the lean ($\lambda>1$) condition, the $NO_x$ trap in the underfloor catalytic converter absorbs $NO_x$, then a fuel-rich ($\lambda<1$) spike is applied which results in $NO_x$ desorption from the trap and catalytic reduction of the $NO_x$ to $N_2$, then a lean condition occurs followed by a rich spike, etc. Rich conditions are required from time to time at higher speeds and loads in order to maintain the temperature of the exhaust gas flowing into the underfloor catalytic converter at a temperature below that which would result in deterioration of the $NO_x$ trap. At stoichiometric or richer than stoichiometric conditions, i.e. $\lambda \leq 1$, the multi-functional catalyst in the underfloor catalytic converter has the capability of reducing the $NO_x$ to $N_2$ without absorption of the $NO_x$ by the trap.

Typically, the lean-burn engine is periodically switched to a relatively rich air/fuel ratio to purge the $NO_x$ trap. The $NO_x$ trap must be exposed to minimum threshold temperatures at specific engine speeds and loads before it will perform efficiently and accordingly, a minimum exhaust temperature must be established before a lean-burn mode of engine operation is established. There are also upper or maximum temperatures within certain speeds and loads, above which the trap will cease operating effectively for trapping $NO_x$. At such higher temperatures with specific speeds and loads, the engine operation will switch from lean to stoichiometric (or rich) conditions. The catalyst in the underfloor catalytic converter will act as a TWC catalyst such that $NO_x$, CO and HCs are effectively removed. Since fuel economy is significantly improved by operating the engine at lean conditions, an apparatus and method are required for sensing the upper temperature limit of the lean operation, thus permitting the temperature of the exhaust gas stream entering the $NO_x$ trap to be lowered, thereby allowing the lean operation of the engine to be extended to cover high speeds and loads which would otherwise be required to occur at stoichiometric conditions. Such extension of the lean operation of the engine would result in dramatically improved fuel savings, while concurrently lowering the formation of the greenhouse gas $CO_2$.

It is also known that at certain higher speeds and loads, the temperature of the exhaust gas stream entering the $NO_x$ trap may exceed the temperatures at which the trap starts to deteriorate. At such extreme conditions of speed and load, the exhaust gas temperature is usually lowered by using fuel enrichment ($\lambda<1$) in order to prevent deterioration of the trap. This practice has a severe adverse impact on fuel economy and also defeats the purpose of fuel savings associated with the lean burn engines. Accordingly, an apparatus and method are required for sensing such upper temperature limits in order to thereby lower the temperature of the exhaust gas stream entering the trap to a temperature below that which is known to cause deterioration of the trap, i.e., the temperature is thereby lowered to about 750° C. or lower.

It is further known that over time, $NO_x$ breakthrough occurs when the trap becomes saturated with $NO_x$ and/or sulfur oxides ("$SO_x$") and must be purged in order to be able to continue to effectively trap the $NO_x$. In order to purge the $SO_x$, the $NO_x$ trap must be exposed to an exhaust gas stream having a temperature in the range of about 600° C. to about 750° C. Since the temperature and time required for purging $SO_x$ from the trap is close to that at which the trap suffers degradation, an apparatus and method is required for sensing $NO_x$ breakthrough and permitting exposure of the trap to the higher temperature exhaust stream during purging to remove $SO_x$.

OBJECTS OF THE INVENTION

It is an object of the present invention to provide an apparatus and a method for controlling the temperature of the exhaust gas entering the underfloor catalytic converter containing a TWC catalyst/$NO_x$ trap such that the $NO_x$ trap will not be exposed to excessively high temperatures thereby causing a deterioration of the $NO_x$ trap during lean conditions of engine operation.

It is a further object of the invention to cause the lean-burn mode of operation of the engine to be extend cover higher engine operation temperatures (i.e., higher speeds and loads) than would usually be possible. It is the common practice, at the temperatures where the $NO_x$ trap become ineffective, to switch the engine operation from lean to stoichiometric, i.e.,$\lambda>1$ to $\lambda=1$. This is necessary in order to facilitate the removal of the gaseous pollutants by the TWC function of the catalyst in the underfloor catalytic converter. The extended lean-burn mode of engine operation thereby improved fuel economy.

It is an additional object of the invention to provide an apparatus and a method which, at engine conditions requiring highs speeds and loads, result in a cooling of the exhaust gas to thereby minute the necessity of using fuel enrichment which would otherwise be required to effect such cooling in order to minimize deterioration of the $NO_x$ trap. This additional object also results in an improvement in fuel economy.

It is yet a further object of the invention to provide an apparatus and a method for purging the $NO_x$ trap of $NO_x$ and/or $SO_x$ without concurrent deterioration of the trap.

These and other objects have been achieved by the invention which is described in detail below.

SUMMARY OF THE INVENTION

In accordance with the present invention, an underfloor catalytic converter containing a multi-functional catalyst, e.g., a TWC catalyst/$NO_x$ trap, is provided in fluid communication with the outlet of the exhaust manifold of the engine. A first temperature sensor is provided in the exhaust outlet and a second temperature sensor is provided in the catalytic converter; (preferably near the inlet of the converter). A $NO_x$ sensor is located at the outlet of the converter in order to sensor $NO_x$ breakthrough, i.e., determine when the trap must be purged to remove $NO_x$ and/or $SO_x$.

The first and second temperature sensors and the $NO_x$ sensor transmit their readings to a controller which transmits signals to proportional valve means located in the exhaust outlet downstream of the first temperature sensor. In response to the signals received from the controller, the proportional valve divides the exhaust gas stream from the engine exhaust manifold into two streams, one of which is sent to a first conduit and the other is sent through a second conduit into a heat exchanger. Any stream exiting the heat exchanger is then blended with the non-heat exchanged stream in the first conduit downstream of the proportional valve means.

The amount of the exhaust gas stream in the first conduit will vary from that in the second conduit such that (a) the temperature of the exhaust gas stream entering the catalytic converter is maintained in the range of about 300 to about 600° C., preferably 350 to 550° C., during the lean mode operation of the engine, and (b) the temperature of the exhaust gas stream entering the catalytic converter is periodically allowed to rise above about 600° C. to the extent necessary to purge the $NO_x$ trap of $SO_x$, i.e., when purging of the trap is required, little or none of the exhaust steam received from the exhaust manifold is sent to the heat exchanger.

DETAILED DESCRIPTION OF THE INVENTION

Figure 1:
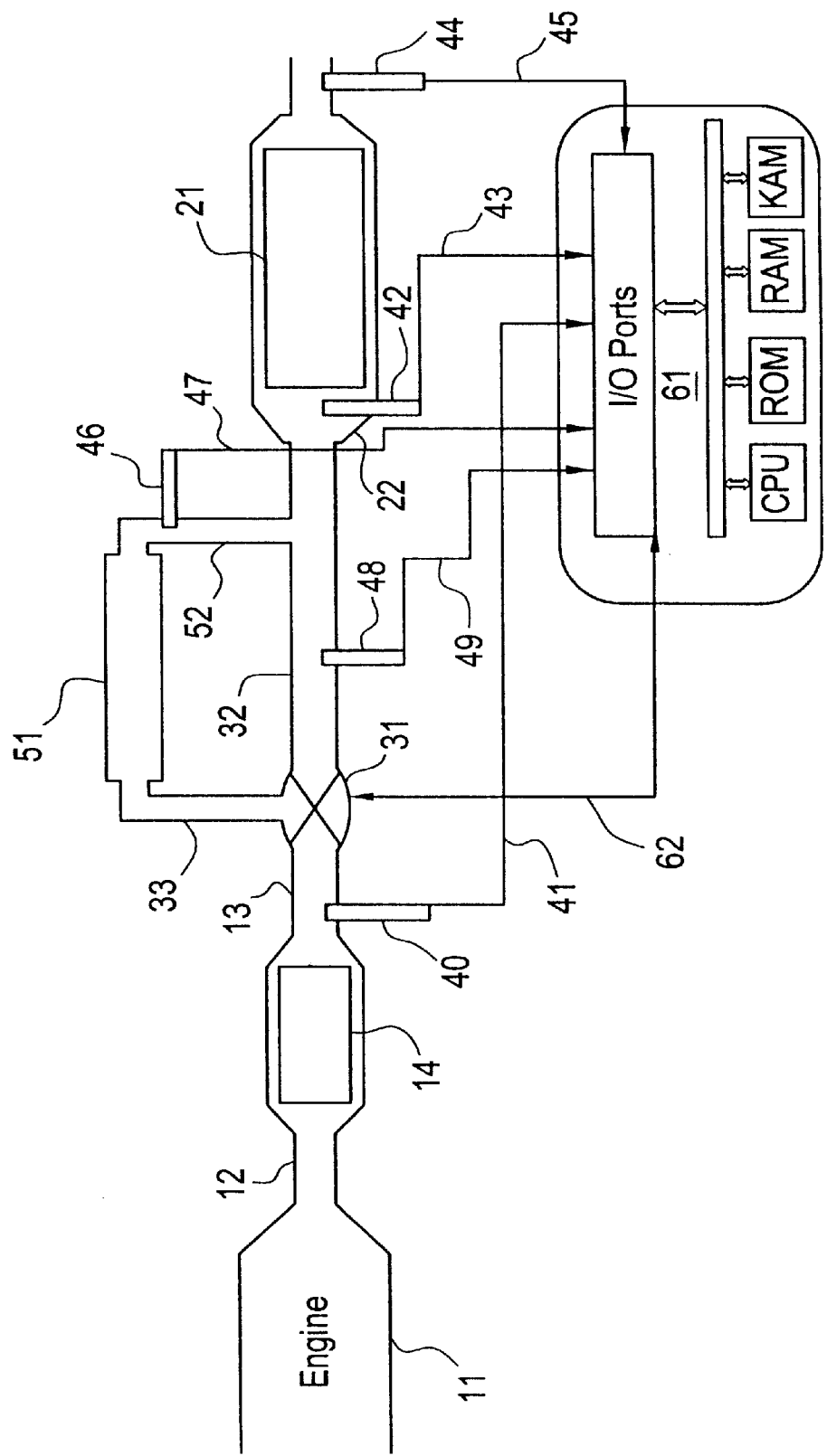
FIG. 1 is a block diagram of an engine and its exhaust system which embodies the features of the present invention.

The present invention is directed to an apparatus and method for vehicle emissions control.

The apparatus for vehicle emission control comprises:

a. an exhaust conduit for receiving the exhaust gas stream from the exhaust manifold of an engine;

b. proportional valve means in fluid communication with the exhaust conduit for dividing the exhaust gas stream into a first stream and a second stream between a first conduit and a second conduit;

c. A heat exchanger in fluid communication with the second conduit, said heat exchanger containing an outlet conduit in fluid communication with the first conduit downstream of the valve means;

d. an underfloor catalytic converter in fluid communication with the first conduit downstream of the heat exchanger outlet conduit, said catalytic converter containing a multi-functional catalyst and an outlet conduit;

e. a first temperature sensor located in the exhaust conduit upstream of the valve means and a second temperature sensor located in the catalytic converter (preferably near the inlet to the catalytic converter), said first and second temperature sensors having the capability of transmitting temperature readings to a controller;

f. a $NO_x$ sensor located in the outlet of the catalytic converter for sensing $NO_x$ breakthrough;

g. a controller in communication with the first temperature sensor, the second temperature sensor, the $NO_x$ sensor and the valve means, said controller being capable of (i) receiving temperature readings from the first and second temperature sensors and readings from the $NO_x$ sensor and (ii) transmitting signals to the valve means in response to the readings such that the valve means thereby controls the amount of exhaust gas stream to be divided between the first conduit and the second conduit.

Preferably, the apparatus of the present invention includes a close-coupled catalytic converter located upstream of the proportional valve means. It is particularly preferred that the close-coupled catalytic converter be located immediately adjacent to (or affixed to) the exhaust manifold of the vehicle's engine.

The close-coupled catalytic converter preferably comprises a three-way conversion ("TWC") catalyst, e.g., one or more platinum group metals disposed on a high surface area, refractory oxide support (the TWC catalyst is typically present in the form of one or more "bricks" enclosed within an appropriate container). Useful platinum group metals include platinum, palladium, rhodium and mixtures thereof. A useful high surface area, refractory oxide support comprises gamma-alumina. It is preferred that the gamma-alumina be stabilized with zirconia, titania, an alkaline earth metal oxide, one or more rare earth metal oxides and mixtures thereof. Preferable alkaline earth metal oxides include baria, calcia, strontia and mixtures thereof. Preferable rare earth metal oxides comprise ceria, lanthana and mixtures thereof. It is preferred that the refractory oxide support be disposed on a monolithic carrier. Preferably, the monolithic carrier comprises a refractory ceramic or metal honeycomb structure.

The underfloor catalytic converter contains a multifunctional catalyst, typically a TWC catalyst of the type described above in respect to the close-closed catalytic carrier in conjunction with a $NO_x$ trap. Typically, the multifunctional catalyst for the underfloor catalytic converter is also present in the form of one or more "bricks" enclosed within an appropriate container. Suitable $NO_x$ trap components include one or more basic oxygenated compounds of one or more metals selected from the group consisting of alkali metals and alkaline earth metals, such as lithium, sodium, potassium, cesium, magnesium, calcium, strontium, barium and mixtures thereof.

Optimum results in respect to $NO_x$ abatement will be obtained during lean operation of the engine (i.e., when $\lambda > 1$) when the temperature of the exhaust gas stream entering the underfloor catalytic converter is maintained in the range of about 300 to about 600° C., preferably 350 to 550° C. The first and second temperature sensors (e.g., thermocouples) will measure the temperature of the exhaust gas stream emanating from the exhaust manifold and entering the underfloor catalytic converter, respectively, and will transmit the temperature readings to the controller. In response to the temperature readings, the controller in turn will transmit signals to the proportional valve means and cause the valve means to be fully closed, be fully open or be partially open at any intermediate position between full closure and full opening depending on the signals received from the controller. For example, if during the lean mode operation of the engine, the temperature reading of the first sensor is between about 300 and about 600° C., the valve means will be fully closed such that all of the exhaust gas stream will be diverted to the first conduit. If during the operation of the engine, the temperature reading of the first sensor is, e.g., 900° C. or higher, the valve means will be fully open such that all of the exhaust gas stream will be diverted to the second conduit (which leads into the heat exchanger). If, during stoichiometric operation of the engine, the temperature reading of the first sensor is, e.g., 700° C., the valve means will be partially open and divide the exhaust gas stream between the first and second conduit.

The second temperature sensor serves as an "override" to the controller to thereby "fine tune" the amount of opening and closing of the valve means and hence the amount of the exhaust gas stream not heat-exchanged (i.e., diverted to the first conduit) and the amount of the exhaust gas stream heat-exchanged (i.e., diverted to the second conduit). The desired result is that during the lean mode operation of the engine, the temperature of the exhaust gas stream flowing into the catalytic converter will be maintained in the range of about 300 to about 600° C., preferably 350 to 550° C.

As mentioned above, the $NO_x$ trap must periodically be purged of $NO_x$ and $SO_x$. The temperature required for purging $SO_x$ will be somewhat greater than the desired maximum temperature of 600° C. for the exhaust gas stream entering the catalytic converter during the lean-burn mode of engine operation. The $NO_x$ sensor located in the outlet of the catalytic converter will sense the permanent $NO_x$ breakthrough is occurring and transmit its readings to the controller. When $NO_x$ breakthrough is such that purging of the trap is required, the $NO_x$ sensor's readings sent to the controller will cause the controller to send a signal to the proportional valve means to prevent the exhaust gas stream from entering the heat exchanger (through the second conduit), and instead send the hot exhaust gas stream to the underfloor catalytic converter for such period of time as is required to effectuate the purging of the trap.

The apparatus and method of the present invention will be better understood by reference to the detailed description of the drawing which is set forth below.

DETAILED DESCRIPTION OF THE DRAWING

FIG. 1 shows an internal combustion engine 11, for example a direct-injection petrol or diesel engine equipped with underfloor catalytic converter 21. Exhaust conduit 13 connects the exhaust manifold 12 of engine 11 to proportional valve means 31. In a preferable embodiment of the present invention, a close-coupled catalytic converter 14 is attached to exhaust manifold 12 and exhaust conduit 13 is attached to the outlet of catalytic converter 14. Exhaust conduit 13 contains first temperature sensor 40 located upstream of proportional valve means 31.

First conduit 32 and second conduit 33 are present in fluid communication with proportional valve means 31. First conduit 32 terminates, and in fluid communication with, underfloor catalytic converter inlet conduit 22 which in turn is in fluid communication with underfloor catalytic converter 21. The exhaust gas stream exits underfloor converter 21 and is vented to the atmosphere (typically though a muffler, which is not shown).

Second conduit 33 terminates, and is in fluid communication with, heat exchanger 51. Heat exchanger 51 is equipped with outlet conduit 52 which terminates, and is in fluid communication with underfloor catalytic converter inlet conduit 22. Underfloor catalytic converter inlet conduit 22 contains second temperature sensor 42 located in underfloor catalytic converter 21. Heat exchanger 51 is preferably a gas/air exchanger from a simplicity point of view since the air flow along the shell of the heat exchanger as the vehicle is in motion provides sufficient cooling capacity without the need for any additional gaseous or liquid coolant.

Temperature sensors 40 and 42 may be identical or different from one another. Suitably, temperature sensors 40 and 42 will consist of commercially available thermocouples which will provide accurate temperature measurements over the temperature range of about 300° C. to about 1200° C. Temperature sensors 40 and 42 provide signals to electronic engine controller ("EEC") 61 over conductors 41 and 43 respectively. Controllers such as EEC 61 are well known in the prior art (e.g., see U.S. Pat. No. 5,722,236) and typically comprises a microcomputer including input/output ("I/O") ports, a central processing unit ("CPU"), read-only memory ("ROM") for storing control programs, random access memory ("RAM") for temporary dat storage and keep-alive memory ("KAM") for storing learned values.

EEC 61 is in electronic communication with proportional valve means 31 by means of feedback conductor 62. Proportional valve means 31 may be of any of the various commercially available types which are capable of receiving electronic signals from a controller such as EEC 61 and causes the valve to fully close, fully open or be open in any intermediate position between fully closed or fully open $NO_x$ sensor 44, for sensing $NO_x$ breakthrough and determining when the trap must be purged to remove $SO_x$, is located in the outlet of underfloor catalytic converter 21 and transmits its readings of $NO_x$ and $SO_x$ levels to EEC 61 via conductor 45.

In order to obtain very accurate control over the temperature of the exhaust gas, it is preferred that additional temperature sensors be present in the apparatus of the invention. Such additional sensors are shown in FIG. 1 as 46 and 48 which are located in the heat exchanger outlet conduit 52 and second conduit 32, respectively. Additional sensors 46 and 48 communicate with EEC 61 by means of conductors 47 and 49, respectively. Additional temperature sensors may be provided as desired and sensors 46 and 48 may be located at other positions in the apparatus as required for fine-tuning the opening and closure of the proportional valve means.

What is claimed is:

1. A method for controlling vehicle emissions which comprises:
    (a) receiving an exhaust gas stream from the exhaust manifold of an engine through an exhaust conduit;
    (b) providing proportional valve means in fluid communication with the exhaust conduit for dividing the gas stream into a first stream and a second stream;
    (c) flowing at least one of the first stream into a first conduit in fluid communication with the valve means and the second stream into a second conduit in fluid communication with the valve means;
    (d) providing a heat exchanger in fluid communication with the second conduit, said heat exchanger containing an outlet conduit in fluid communication with the first conduit downstream of the valve means;
    (e) providing only one underfloor catalytic converter in fluid communication with the first conduit downstream of the heat exchanger outlet conduit, said catalytic converter containing a multi-functional catalyst and an outlet conduit;
    (f) providing a first temperature sensor located in the exhaust gas conduit upstream of the valve means and a second temperature sensor located in the catalytic converter, said first and second temperature sensors having the capability of transmitting temperature readings to a controller;
    (g) providing a $NO_x$ sensor located in the catalytic converter outlet conduit for sensing when $NO_x$ breakthrough is occurring;
    (h) providing a controller in communication with the first temperature sensor, the second temperature sensor, the $NO_x$ sensor and the valve means, said controller being capable of (1) receiving readings from the first and second sensors and the $NO_x$ sensor and (2) transmitting signals to the valve means; and
    (i) operating the valve means in response to the signals received from the controller to thereby divide the exhaust stream between the first conduit and the second conduit in amounts such that (1) the temperature of the exhaust gas stream flowing into the underfloor catalytic converter is maintained in the range of about 300 to about 600° C. during lean mode operation of the engine and (2) the multi-functional catalyst is periodically purged of at least one of $NO_x$ and $SO_x$.

2. The method of claim 1 wherein: (a) the $NO_x$ sensor senses that $NO_x$ breakthrough is occurring and transmits a reading of the $NO_x$ breakthrough to the controller; (b) the controller receiving such reading transmits a signal to the valve means; and (c) in response to such signal, the valve means causes the exhaust gas stream to be divided in amounts between the first conduit and the second conduit such that the temperature of the exhaust gas stream entering the underfloor catalytic converter is in the range of about 600° C. to about 750° C. such that the multi-functional catalyst is purged of $SO_x$.

3. The method of claim 1 wherein the temperature of the exhaust gas stream flowing into the underfloor catalytic converter is maintained in the range of 350 to 550° C.

4. The method of claim 3 further comprising providing a close-coupled catalytic converter located upstream of the valve means.

5. The method of claim 4 wherein the close-coupled catalyst unit is located immediately adjacent to the exhaust manifold.

6. The method of claim 5 wherein the close-coupled catalytic converter comprises a three-way conversion catalyst.

7. The method of claim 6 wherein the three-way conversion catalyst comprises one or more platinum group metals disposed on a high surface area, refractory oxide support.

8. The method of claim 7 wherein the platinum group metals are selected from the group consisting of platinum, palladium, rhodium and mixtures thereof.

9. The method of claim 7 wherein the support is disposed on a monolithic carrier.

10. The method of claim 9 wherein the monolithic carrier comprises a refractory ceramic or metal honeycomb structure.

11. The method of claim 7 wherein the support comprises gamma-alumina.

12. The method of claim 11 wherein the gamma-alumina is stabilized with zirconia, titania, an alkaline earth metal oxide, one or more rare earth metal oxides and mixtures thereof.

13. The method of claim 12 wherein the alkaline earth metal oxide is selected from the group consisting of baria, calcia, strontia and mixtures thereof.

14. The method of claim 12 wherein the rare earth metal oxides are selected from the group consisting of ceria, lanthana and mixtures thereof.

15. The method of claim 1 wherein the multi-functional catalyst comprises a three-way conversion catalyst and a $NO_x$ trap.

16. The method of claim 15 wherein the $NO_x$ trap comprises one or more basic oxygenated compounds of one or more metals selected from the group consisting of alkali metals and alkaline earth metals.

17. The method of claim 16 wherein the $NO_x$ trap comprises one or more of basic oxygenated compounds of metals selected from the group consisting of lithium, sodium, potassium, cesium, magnesium, calcium, strontium, barium and mixtures thereof.

18. The method of claim 15 wherein the three-way conversion catalyst comprises one or more platinum group metals disposed on a high surface area, refractory oxide support.

19. The method of claim 18 wherein the platinum group metals are selected from the group consisting of platinum, palladium, rhodium and mixtures thereof.

20. The method of claim 18 wherein the support is disposed on a monolithic carrier.

21. The method of claim 20 wherein the monolithic carrier comprises a refractory ceramic or metal honeycomb structure.

22. The method of claim 18 wherein the support comprises gamma-alumina.

23. The method of claim 22 wherein the gamma-alumina is stabilized with zirconia, titania, an alkaline earth metal oxide, one or more rare earth metal oxides and mixtures thereof.

24. The method of claim 23 wherein the alkaline earth metal oxide is selected from the group consisting of baria, calcia, strontia and mixtures thereof.

25. The method of claim 23 wherein the rare earth metal oxides are selected from the group consisting of ceria, lanthana and mixtures thereof.

* * * * *

UNITED STATES PATENT AND TRADEMARK OFFICE
CERTIFICATE OF CORRECTION

| | |
|---|---|
| PATENT NO. | : 6,568,179 B2 |
| APPLICATION NO. | : 09/797236 |
| DATED | : May 27, 2003 |
| INVENTOR(S) | : Deeba |

It is certified that error appears in the above-identified patent and that said Letters Patent is hereby corrected as shown below:

<u>Column 8,</u>
Line 14, insert -- gas -- after "exhaust".
Lines 20-67, change:
Claim 3 to read Claim 2.
Claim 4 to read Claim 3 and change its dependency to read on Claim 2.
Claim 5 to read Claim 4 and change its dependency to read on Claim 3.
Claim 6 to read Claim 5 and change its dependency to read on Claim 4.
Claim 7 to read Claim 6 and change its dependency to read on Claim 5.
Claim 8 to read Claim 7 and change its dependency to read on Claim 6.
Claim 11 to read Claim 8 and change its dependency to read on Claim 6.
Claim 12 to read Claim 9 and change its dependency to read on Claim 8.
Claim 13 to read Claim 10 and change its dependency to read on Claim 9.
Claim 14 to read Claim 11 and change its dependency to read on Claim 10.
Claim 20 to read Claim 12 and change its dependency to read on Claim 6.
Claim 10 to read Claim 13 and change its dependency to read on Claim 12.
Claim 15 to read Claim 14.
Claim 18 to read Claim 15 and change its dependency to read on Claim 14.
Claim 19 to read Claim 16 and change its dependency to read on Claim 15.
Claim 22 to read Claim 17 and change its dependency to read on Claim 15.
Claim 23 to read Claim 18 and change its dependency to read on Claim 17.
Claim 24 to read Claim 19 and change its dependency to read on Claim 18.
Claim 25 to read Claim 20 and change its dependency to read on Claim 18.
Claim 9 to read Claim 21 and change its dependency to read on Claim 15.
Claim 21 to read Claim 22 and change its dependency to read on Claim 21.
Claim 16 to read Claim 23 and change its dependency to read on Claim 1.
Claim 17 to read Claim 24 and change its dependency to read on Claim 23.

UNITED STATES PATENT AND TRADEMARK OFFICE
CERTIFICATE OF CORRECTION

PATENT NO. : 6,568,179 B2
APPLICATION NO. : 09/797236
DATED : May 27, 2003
INVENTOR(S) : Deeba It is certified that error appears in the above-identified patent and that said Letters Patent is hereby corrected as shown below:

Column 8 (cont'd),
Claim 2 to read Claim 25.

Signed and Sealed this

Twentieth Day of June, 2006

JON W. DUDAS
*Director of the United States Patent and Trademark Office*